United States Patent [19]

Ollinger et al.

[11] 4,079,564

[45] Mar. 21, 1978

[54] SUB-MODULAR CROSS-TEE ATTACHMENT

[75] Inventors: James C. Ollinger; Kenneth L. Wasson, both of Lancaster, Pa.

[73] Assignee: Armstrong Cork Company, Lancaster, Pa.

[21] Appl. No.: 788,288

[22] Filed: Apr. 18, 1977

[51] Int. Cl.² ........................... E04C 2/42; F16B 7/22
[52] U.S. Cl. ................................ 52/664; 403/230; 403/244
[58] Field of Search ............... 403/252, 253, 230, 245, 403/244, 250; 52/656, 664, 665–668, 488, 484, 461, 498

[56] References Cited

U.S. PATENT DOCUMENTS

| 1,074,895 | 10/1913 | Rapp | 52/461 |
|---|---|---|---|
| 3,016,997 | 1/1962 | Price | 52/668 |
| 3,067,323 | 12/1962 | Kember | 52/484 |
| 3,633,952 | 7/1970 | Nikolaus | 403/230 |
| 3,798,865 | 3/1974 | Curtis | 52/665 |
| 3,828,516 | 8/1974 | Kern | 403/250 |
| 3,835,614 | 9/1974 | Downing | 52/666 |

FOREIGN PATENT DOCUMENTS

| 736,145 | 6/1966 | Canada | 52/495 |
|---|---|---|---|
| 65,636 | 10/1955 | France | 52/495 |
| 403,258 | 7/1966 | Switzerland | 52/498 |

Primary Examiner—Price C. Faw, Jr.
Assistant Examiner—James L. Ridgill, Jr.

[57] ABSTRACT

The invention is directed to a ceiling runner which has a generally U-shaped configuration and a means for attaching a cross tee thereto. The runner has flanges to support ceiling boards. The side walls of the runner are formed with grooves which may be used to support the runner in position or define an isolated chamber within the body of the runner. The side walls of the runner have a second groove which is used for positioning ceiling boards on the flanges. A fastening means is provided to connect the end of a cross tee runner to the side of the U-shaped runner.

1 Claim, 3 Drawing Figures

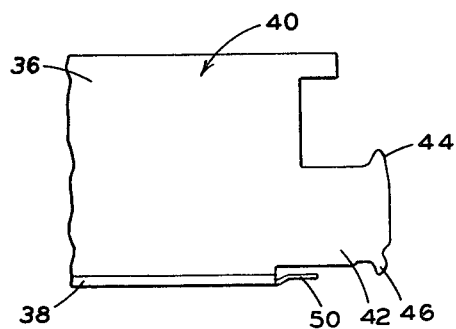
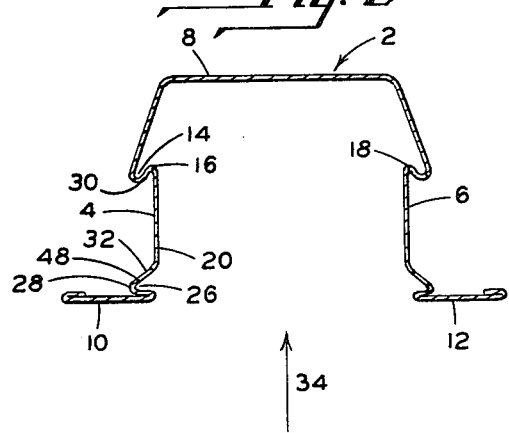
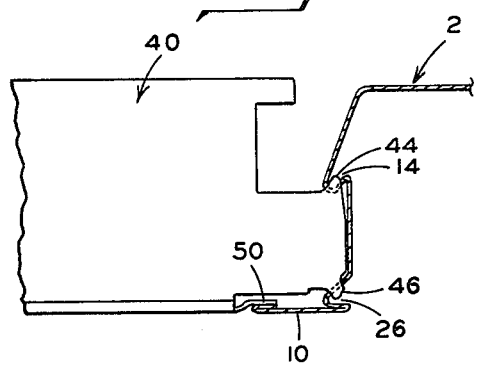

SUB-MODULAR CROSS-TEE ATTACHMENT

CROSS-REFERENCE TO RELATED APPLICATION

This application is related to the ceiling runner set forth in U.S. Application Ser. No. 780,418, filed Mar. 23, 1977, in the name of E. B. Nute, Jr. and entitled "CEILING RUNNER".

BACKGROUND OF THE INVENTION

1. Field of the Invention

The invention is directed to a suspended ceiling system and, more particularly, to a runner member of a specific configuration for use in the suspended ceiling system.

2. Description of the Prior Art

U.S. Pat. No. 2,447,694 is directed to a runner structure having a configuration somewhat similar to that of the claimed invention. The runner structure therein is not an exposed grid member in that it cannot be viewed from below a suspended ceiling system, and it functions primarily as a fastening means for another runner in a concealed grid system suspended ceiling.

U.S. Pat. No. 3,067,323 is directed to another runner structure which has a cross-sectional configuration somewhat like the claimed invention. Again, the patented structure differs from the claimed invention primarily in the fact that the patented structure is not formed to be mounted as per the claimed invention and that the patented structure does not have flanges for supporting a ceiling system.

Finally, U.S. Pat. No. 3,708,932 is directed to a grid member having a structure slightly similar to the claimed invention. The primary difference between the patented structure and the claimed invention is the positioning of the groove structure in the side walls of the runner member.

The claimed invention herein is a specifically designed runner structure which is meant to carry out specific functions, as will be set forth below, and the means for connecting a cross tee to the side of said runner.

SUMMARY OF THE INVENTION

The invention herein is a ceiling runner which is to be used in a suspended ceiling system and the means used to fasten to the ceiling runner a second ceiling runner known as a cross tee runner. The runner is of a generally elongated inverted U-shaped configuration. The runner has two partly inclined side walls which are connected together by a flat top member. The runner has horizontal flanges which are used to support ceiling boards. The side walls of the runner have a first groove means therein, and said groove means extend outwardly from the side wall to form two parallel ledges inside of the U-shaped body configuration of the runner. The grooves are positioned about midway of the side walls of the runner. A second groove means is provided in the side walls closely adjacent the horizontal flanges.

A cross-tee runner is provided with an extension on the end thereof. The extension has two projections, one extending upwardly and one extending downwardly. These extensions engage the two groove means to lock the cross-tee runner to the inverted U-shaped runner.

BRIEF DESCRIPTION OF THE DRAWING

FIG. 1 is a side view of the end configuration of a cross-tee runner;

FIG. 2 is a cross-sectional view of the U-shaped main runner structure; and

FIG. 3 is an end view of the two runner structures fastened together with the end of the cross-tee runner engaging the side of the main runner structure.

DESCRIPTION OF THE PREFERRED EMBODIMENT

Referring first to FIG. 2, the sheet metal elongated runner structure 2 herein has generally the cross-sectional configuration shown. This cross-sectional configuration is generally an inverted "U" shape with side walls 4 and 6. The side walls 4 and 6 are connected together by a flat top member 8. Horizontal flanges 10 and 12 extend outwardly from the runner member 2 at the lower ends of the side walls 4 and 6. It is on these flanges 10 and 12 that ceiling boards will be supported. The runner members 2 are arranged in a grid pattern so as to support ceiling boards on the flanges 10 and 12 within the grid pattern.

Each of the side walls has a groove 14 therein at the mid region thereof. The grooves extend outwardly from the side wall to form two parallel ledges 16 and 18 on the inside of the U-shaped body configuration. The grooves 14 extend below and outwardly of these parallel ledges 16 and 18. The grooves, in effect, form an overhang over a portion 20 of the side walls. A number of the runner members 2 are assembled together in the manner disclosed in the above-mentioned copending application entitled "CEILING RUNNER". When the runners 2 are assembled together, they are normally assembled together in five-foot square modules. It is desirable to subdivide these five-foot square modules into smaller size modules of five feet in length, but of less than five feet in width. The subdivision of the modules is carried out through the use of cross-tee runners to be described below.

As shown in FIG. 2, the runner 2 in the lower portion of the side walls 4 and 6 is provided with a second groove 26 which faces inwardly of the U-shaped configuration of the runner and forms a stop 28 which extends outwardly from the lower portion 20 of the side walls. This stop is utilized for the positioning of ceiling boards which are placed upon the flanges 10 and 12. As shown in FIG. 2, the lower wall forming the groove 14 is provided with a slot 30. The upper wall forming groove 26 is also provided with a slot indicated as 32. These slots are approximately 1/16 inch in width and approximately ⅛ inch in length. By positioning these slots in the locations shown in FIG. 2, these slots will not be visible when one is viewing the runner 2 in a suspended ceiling system when one looks up at the runner 2 from the direction indicated by the arrow 34.

FIG. 1 is a showing of an end detail for a cross-tee runner 40. Generally, a cross-tee runner is of an inverted "T" configuration comprising a vertical web 36 and a horizontal flange 38 which extends on both sides of the web 36. The cross-tee runner 40 has its end configuration formed as shown in FIG. 1. Certain portions of the vertical web and horizontal flange are cut away to form the structure shown. The structure has, in effect, an extension member 42 which extends outwardly beyond the end of the vertical web and horizontal flange. On the end of the extension 42 there is provided an upward projection 44 and a downward facing projection 46. These projections 44 and 46 are so positioned relative each other that they will project into the openings 30 and 32 in runner 2. The upper projection 44 is engaged in slot 30, and the lower projection 46 is pushed across the edge 48 of slot 32 to permit the projection 46 to snap into slot 32. The horizontal flange 38 is provided with an upturned edge 50 which rests upon the edge of the flange 10, as shown in FIG. 3. FIG. 3 is a showing of the cross-tee runner 40 in position in the side of runner 2 with the projection 44 and projection 46 extending through the slots of the walls forming grooves 14 and 26. There is thus provided a very positive engagement of the cross-tee runner with the main runner 2. Normally, the slots are positioned at one-foot intervals along the length of the runner 2 so that the five-foot module formed by the runners 2 can be divided into five modules of one foot by five foot through the use of the cross-tee runners 40.

The runner members are normally painted black on their inside with the flanges painted white and are made from sheet metal. They are bent or cut into the required configuration and are suspended from the structural ceiling of a room. Either conventional wire suspension means or special suspension structures may be used to suspend the ceiling runners at a spaced distance from the structural ceiling of a room. All parts of the conventional ceiling system are well known in the art, with the inventive concept herein being the cross-sectional configuration of the runner member and the end detail of the cross-tee runner so that the two runner structures may be placed in engagement.

What is claimed is:

1. In a ceiling suspension system comprising at least one ceiling runner have an elongated sheet metal body with a generally inverted U-shaped configuration, said runner having two side walls connected together at their one ends with a flat top member, the opposite sides of the side walls having horizontal flanges which extend outwardly from the body of the runner to support ceiling boards on either side of the runner, said side walls having a first groove means therein, said first groove means being in the mid region of the side walls and extending outwardly from the side walls to form two parallel ledges inside the U-shaped body configuration, said grooves extending below and outwardly of the parallel ledges and said grooves being defined by a first wall structure, and a second groove means in the side wall closely positioned to the horizontal flanges, said second groove means being defined by a second wall structure which underlies the first wall structure defining the first groove means, slot means being cut in the sides facing each other of the two wall means which define the two groove means, said ceiling suspension system also comprising at least one cross-tee runner having an elongated sheet metal body and a generally inverted T-shaped configuration, said cross-tee runner having an extension extending beyond the end of the upright body member of the inverted "T" shaped cross-tee runner, said extension having a projection on the upper corner of the end of the extension and a projection on the lower corner of the extension, said projections being within the plane of the extension and being positioned generally one above the other, and said projections being inserted into the slot means provided in said runner structure to lock together said cross-tee runner to said other runner.

* * * * *